(12) United States Patent  
Ashametra et al.

(10) Patent No.: US 9,299,372 B1
(45) Date of Patent: Mar. 29, 2016

(54) SWAGE KEY ENABLING SIMULTANEOUS TRANSFER OF TWO HEAD GIMBAL ASSEMBLIES ONTO TWO CORRESPONDING ACTUATOR PIVOT FLEX ASSEMBLY ARMS

(71) Applicant: Western Digital Technologies, Inc., Irvine, CA (US)

(72) Inventors: Saravut Ashametra, Bangpa-In (TH); Prachearn Thaijarearn, Klonglaung (TH)

(73) Assignee: Western Digital Technologies, Inc., Irvine, CA (US)

( * ) Notice: Subject to any disclaimer, the term of this patent is extended or adjusted under 35 U.S.C. 154(b) by 0 days.

(21) Appl. No.: 14/738,797

(22) Filed: Jun. 12, 2015

Related U.S. Application Data

(60) Provisional application No. 62/154,302, filed on Apr. 29, 2015.

(51) Int. Cl.
*G11B 5/48* (2006.01)

(52) U.S. Cl.
CPC ............ *G11B 5/4826* (2013.01); *G11B 5/4833* (2013.01)

(58) Field of Classification Search
CPC ...... G11B 5/48; G11B 5/4833; G11B 5/4886; G11B 5/45; G11B 21/16; G11B 21/21
USPC ............ 360/244.5, 244.6, 245.2, 265.9, 26.1; 29/603.03
See application file for complete search history.

(56) References Cited

U.S. PATENT DOCUMENTS

| | | |
|---|---|---|
| 6,049,973 A | 4/2000 | Frank, Jr. et al. |
| 6,467,153 B2 | 10/2002 | Butts et al. |
| 6,651,192 B1 | 11/2003 | Viglione et al. |
| 6,657,801 B1 | 12/2003 | Chue et al. |
| 6,687,093 B1 | 2/2004 | Butler et al. |
| 6,751,041 B1 | 6/2004 | Codilian et al. |
| 6,788,480 B1 | 9/2004 | Codilian et al. |
| 6,791,782 B1 | 9/2004 | Codilian et al. |
| 6,792,669 B2 | 9/2004 | Codilian |
| 6,798,592 B1 | 9/2004 | Codilian et al. |
| 6,894,861 B1 | 5/2005 | Codilian et al. |
| 6,897,393 B1 | 5/2005 | Codilian et al. |
| 6,898,044 B1 | 5/2005 | Chheda |
| 6,943,972 B1 | 9/2005 | Chue et al. |
| 7,003,626 B1 | 2/2006 | Chheda et al. |
| 7,027,242 B1 | 4/2006 | Terrill et al. |
| 7,046,467 B1 | 5/2006 | Chheda |

(Continued)

OTHER PUBLICATIONS

Chaiya Thongrattana, et al., U.S. Appl. No. 14/557,221, filed Dec. 1, 2014, 20 pages.

*Primary Examiner* — Jefferson Evans

(57) ABSTRACT

A device for loading a first and second head gimbal assemblies (HGAs) onto an actuator pivot flex assembly (APFA) of a hard disk drive may comprise a gripper configured to grip the HGAs and to move them between the first and second actuator arms of the APFA. A swage key may be moved to a first position such that first and second distal portions thereof are respectively disposed between the first and second HGAs, and to a second position such that the HGAs are supported, respectively, by first and second localized humps defined on the swage key and aligned with boss holes of the APFA. The swage key may be moved to a third position such that the HGAs face first and second proximal portions of the swage key and become seated onto the boss holes.

21 Claims, 6 Drawing Sheets

(56) References Cited

U.S. PATENT DOCUMENTS

| | | |
|---|---|---|
| 7,058,759 B1 | 6/2006 | Reiser et al. |
| 7,072,129 B1 | 7/2006 | Cullen et al. |
| 7,076,391 B1 | 7/2006 | Pakzad et al. |
| 7,076,603 B1 | 7/2006 | Chheda |
| 7,136,242 B1 | 11/2006 | Chue et al. |
| 7,139,145 B1 | 11/2006 | Archibald et al. |
| 7,145,744 B1 | 12/2006 | Clawson et al. |
| 7,178,432 B1 | 2/2007 | Han et al. |
| 7,199,959 B1 | 4/2007 | Bryant |
| 7,203,020 B1 | 4/2007 | Viglione et al. |
| 7,209,310 B1 | 4/2007 | Tsai et al. |
| 7,222,410 B1 | 5/2007 | Klassen et al. |
| 7,236,911 B1 | 6/2007 | Gough et al. |
| 7,269,525 B1 | 9/2007 | Gough et al. |
| 7,458,282 B1 | 12/2008 | Wuester, Sr. et al. |
| 7,490,398 B1 | 2/2009 | Klassen et al. |
| 7,506,553 B1 | 3/2009 | Panyavoravaj |
| 7,549,204 B1 | 6/2009 | Vangal-Ramamurthy et al. |
| 7,552,526 B1 | 6/2009 | Klassen et al. |
| 7,559,590 B1 | 7/2009 | Jones |
| 7,561,416 B1 | 7/2009 | Sarraf |
| 7,596,722 B1 | 9/2009 | Pakzad et al. |
| 7,634,375 B1 | 12/2009 | Pakzad et al. |
| 7,653,983 B1 | 2/2010 | Klassen |
| 7,669,711 B1 | 3/2010 | Westwood |
| 7,671,599 B1 | 3/2010 | Tan et al. |
| 7,673,638 B1 | 3/2010 | Boynton et al. |
| 7,690,705 B1 | 4/2010 | Roberts et al. |
| 7,694,410 B2 | 4/2010 | Kamigama et al. |
| 7,743,486 B1 | 6/2010 | Klassen et al. |
| 7,863,889 B1 | 1/2011 | Bamrungtham |
| 7,869,182 B1 | 1/2011 | Tan et al. |
| 7,869,183 B1 | 1/2011 | Tan et al. |
| 7,874,424 B1 | 1/2011 | Westwood |
| 7,896,218 B2 | 3/2011 | Rakpongsiri et al. |
| 7,900,272 B1 | 3/2011 | Tan et al. |
| 7,912,666 B1 | 3/2011 | Pakzad et al. |
| 7,916,599 B1 | 3/2011 | Panyavoravaj et al. |
| 7,921,543 B2 | 4/2011 | Trongjitwikrai et al. |
| 7,940,487 B1 | 5/2011 | Krishnan et al. |
| 7,974,038 B2 | 7/2011 | Krishnan et al. |
| 7,980,159 B1 | 7/2011 | Han |
| 7,987,585 B1 | 8/2011 | Klassen et al. |
| 8,049,995 B1 | 11/2011 | Ee et al. |
| 8,066,171 B1 | 11/2011 | Rakpongsiri et al. |
| 8,078,421 B1 | 12/2011 | Shastry et al. |
| 8,092,610 B1 | 1/2012 | Tarrant |
| 8,094,414 B1 | 1/2012 | Cheng et al. |
| 8,098,460 B1 | 1/2012 | Jen et al. |
| 8,127,643 B1 | 3/2012 | Tan |
| 8,135,208 B1 | 3/2012 | Vangal-Ramamurthy |
| 8,162,366 B1 | 4/2012 | Tan et al. |
| 8,168,033 B1 | 5/2012 | Mohamad Nor |
| 8,180,487 B1 | 5/2012 | Vangal-Ramamurthy et al. |
| 8,199,425 B1 | 6/2012 | Gustafson et al. |
| 8,218,256 B1 | 7/2012 | Lin et al. |
| 8,223,448 B1 | 7/2012 | Haw et al. |
| 8,230,570 B1 | 7/2012 | Choong |
| 8,245,601 B1 | 8/2012 | Hastama et al. |
| 8,267,831 B1 | 9/2012 | Olsen et al. |
| 8,270,118 B1 | 9/2012 | Cheng et al. |
| 8,300,338 B1 | 10/2012 | McFadyen |
| 8,307,537 B1 | 11/2012 | Klassen et al. |
| 8,312,585 B1 | 11/2012 | Tarrant |
| 8,322,235 B1 | 12/2012 | Keopuang et al. |
| 8,327,529 B1 | 12/2012 | Tan et al. |
| 8,335,049 B1 | 12/2012 | Liu et al. |
| 8,339,747 B1 * | 12/2012 | Hales ................... G11B 5/455 29/603.03 |
| 8,345,367 B1 | 1/2013 | Tharumalingam |
| 8,356,384 B1 | 1/2013 | Ferre et al. |
| 8,369,073 B2 | 2/2013 | Trinh et al. |
| 8,379,363 B1 | 2/2013 | Kolunthavelu et al. |
| 8,387,631 B1 | 3/2013 | Thonghara et al. |
| 8,424,418 B1 | 4/2013 | Wuester, Sr. et al. |
| 8,424,824 B1 | 4/2013 | Tan et al. |
| 8,432,630 B1 | 4/2013 | Lin et al. |
| 8,432,631 B1 | 4/2013 | Lin et al. |
| 8,447,430 B1 | 5/2013 | Tan et al. |
| 8,447,551 B1 | 5/2013 | Ong et al. |
| 8,451,578 B1 | 5/2013 | Tan et al. |
| 8,453,841 B1 | 6/2013 | James et al. |
| 8,454,755 B1 | 6/2013 | Tan et al. |
| 8,480,066 B2 | 7/2013 | Anderson et al. |
| 8,485,772 B1 | 7/2013 | Ismail et al. |
| 8,493,681 B1 | 7/2013 | Selvaraj |
| 8,536,875 B2 | 9/2013 | Ogle et al. |
| 8,537,480 B1 | 9/2013 | Haw |
| 8,544,164 B1 | 10/2013 | Cheng et al. |
| 8,547,657 B1 | 10/2013 | Liu et al. |
| 8,553,968 B1 | 10/2013 | Lee et al. |
| 8,561,285 B1 | 10/2013 | Vangal-Ramamurthy et al. |
| 8,565,511 B1 | 10/2013 | Sungkhaphong et al. |
| 8,582,229 B1 | 11/2013 | Krishnan |
| 8,596,107 B1 | 12/2013 | Wongdao et al. |
| 8,605,383 B1 | 12/2013 | Wang et al. |
| 8,640,328 B1 | 2/2014 | Yow et al. |
| 8,650,716 B1 | 2/2014 | Methe et al. |
| 8,653,824 B1 | 2/2014 | Liu et al. |
| 8,662,554 B1 | 3/2014 | Srisupun et al. |
| 8,683,676 B1 | 4/2014 | Wuester, Sr. et al. |
| 8,689,433 B1 | 4/2014 | Choong |
| 8,707,531 B1 | 4/2014 | Sungkhaphong et al. |
| 8,713,333 B1 | 4/2014 | Selvaraj |
| 8,763,790 B1 | 7/2014 | Neamsuwan et al. |
| 8,789,446 B1 | 7/2014 | Sungkhaphong et al. |
| 8,811,135 B1 | 8/2014 | Kasino et al. |
| 8,996,143 B2 | 3/2015 | Vangal-Ramamurthy et al. |
| 2008/0060190 A1 | 3/2008 | Pfeiffer et al. |
| 2008/0084630 A1 | 4/2008 | Trongjitwikrai et al. |
| 2009/0021009 A1 * | 1/2009 | Baumgart ............. F16B 1/0014 285/381.2 |
| 2009/0157848 A1 | 6/2009 | Khoo |
| 2010/0108256 A1 | 5/2010 | Roajanasiri et al. |
| 2013/0057986 A1 * | 3/2013 | Vangal-Ramamurthy G11B 5/4806 360/244.6 |
| 2013/0248545 A1 | 9/2013 | Thongjitti et al. |

* cited by examiner

SWAGE KEY ENABLING SIMULTANEOUS TRANSFER OF TWO HEAD GIMBAL ASSEMBLIES ONTO TWO CORRESPONDING ACTUATOR PIVOT FLEX ASSEMBLY ARMS

CROSS-REFERENCE TO RELATED APPLICATION

This application claims priority to provisional U.S. Patent Application Ser. No. 62/154,302, filed on Apr. 29, 2015, which is hereby incorporated by reference in its entirety.

BACKGROUND

Embodiments are related to the manufacture of data storage devices. In particular, embodiments are related to the manufacture of hard disk drives and hybrid disk drives containing both solid state and rotating media.

DETAILED DESCRIPTION

Figure 1:
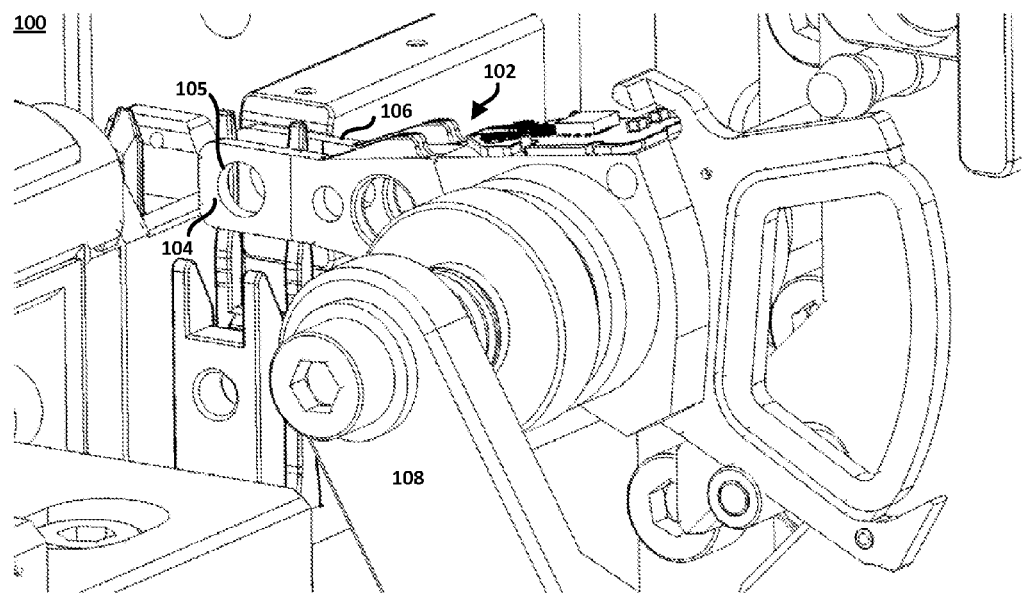
FIG. 1 shows a device and aspects of a method, according to one embodiment.

A typical hard disk drive includes a head disk assembly ("HDA") and a printed circuit board assembly ("PCBA"). The HDA includes at least one magnetic disk ("disk"), a spindle motor for rotating the disk, and a head stack assembly ("HSA") that includes a slider with at least one transducer or read/write element (also called "head") for reading and writing data. Hybrid disk drives may also include solid state memory. The HSA is controllably positioned by a servo system in order to read or write information from or to particular tracks on the disk. The typical HSA has three primary portions: (1) an actuator arm assembly that moves in response to the servo control system; (2) a HGA that extends from the actuator arm assembly and biases the slider toward the disk; and (3) a flex cable assembly that provides an electrical interconnect with minimal constraint on movement.

A typical HGA includes a load beam, a gimbal attached to an end of the load beam, and a slider attached to the gimbal. The load beam has a spring function that provides a "gram load" biasing force and a hinge function that permits the slider to follow the surface contour of the spinning disk. The load beam has an actuator end that connects to the actuator arm and a gimbal end that connects to the gimbal that supports the slider and transmits the gram load biasing force to the slider to "load" the slider against the disk. A rapidly spinning disk develops a laminar airflow above its surface that lifts the slider away from the disk in opposition to the gram load biasing force. In this state, the slider is commonly said to be "flying", although the sliders do not, in fact, fly or develop an aerodynamic force like lift (as air foils do due to the Bernoulli effect).

Swaging Process

Structurally, the slider comprising read and write transducers is attached to the end of an HGA which is attached to an actuator arm to form the HSA through a ball swaging process. This process uses a stainless steel ball having a diameter that is wider than a corresponding boss hole in a base plate of the HGA. As the ball is forced through the hole, the base plate expands and deforms. This deformation mechanically attaches the HGA to the actuator arm with a predetermined amount of contact pressure and retention torque.

Bonding Process

Early HGAs included a number of twisted wires within a tube attached to a side of the actuator arm to electrically couple the slider to the preamplifier. However, more recent developments in the disk drive industry, such as the continuing miniaturization of slider assemblies (including the head and the transducer) and the transition to magnetoresisitive (MR) heads have led to abandoning such configurations in favor of a configuration in which conductive traces are laid on a polyimide film formed on or coupled to the HGA. Such technologies are variously named TSA (Trace Suspension Assembly), CIS (Circuit Integrated Suspension, FOS (Flex On Suspension) and the like. Each of these technologies replaces the discrete twisted wires with conductive traces (copper, for example) and insulating (such as polyimide, for example) and support or cover layers (including stainless steel, for example). These conductive traces interconnect the transducer elements of the head to the drive preamplifier and the circuits associated therewith.

During the manufacture of the TSA, a masking and etching process is used to form the laminate flexure, which is then welded onto the load beam. The TSA includes a plurality of conductive traces as well as four or more bonding pads to electrically couple the slider to the preamplifier. The slider itself includes at least four bonding pads configured to align with the bonding pads on the TSA. As the size and pitch of the bonding pads is quite small, it is imperative that the bonding pads on the flexure be precisely located to insure the proper flying height and orientation of the slider above the facing recording surface. Thus, the bonding pads of the HGA must be precisely positioned for the bonding process to take place and to ensure proper yields.

Figure 2:
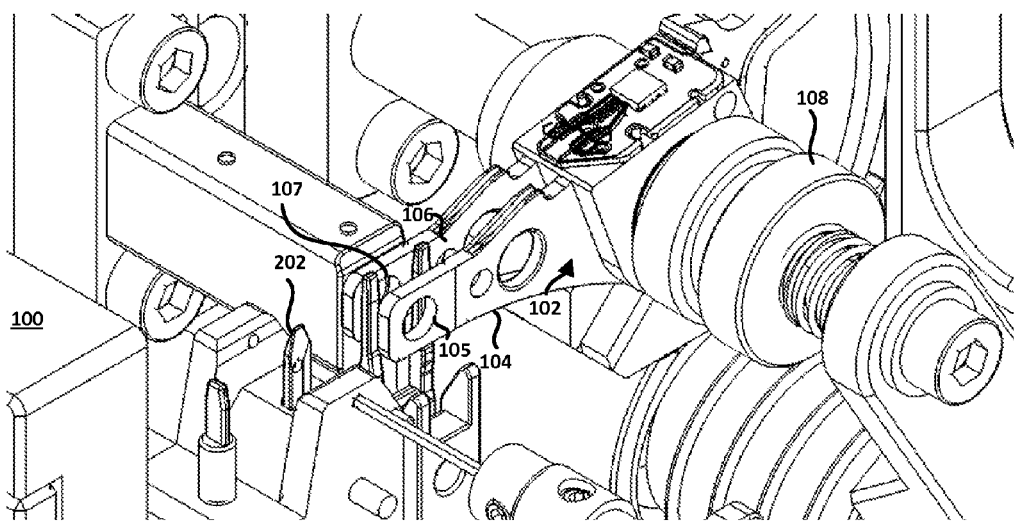
FIG. 2 is a view of the device of FIG. 1 from another angle, showing additional structure of the device and additional aspects of a method according to one embodiment.

FIGS. 1 and 2 show a portion of a device 100 and aspects of a method, according to one embodiment. One of the functions of the device shown in FIGS. 1 and 2 is to load a first HGA and a second HGA onto an APFA 102 of a data storage device comprising a hard disk drive. The APFA 102, as shown, may comprise a first APFA arm 104 defining a first boss hole 105 and a next adjacent second APFA arm 106 defining a second boss hole (obscured by the first APFA arm 104 in FIG. 1 but shown in FIG. 2 at 107). As shown, the device 100 may comprise a support 108 configured to hold the APFA 102. In this state, the APFA 102 is ready for the loading of first and second HGAs thereto.

Figure 3:
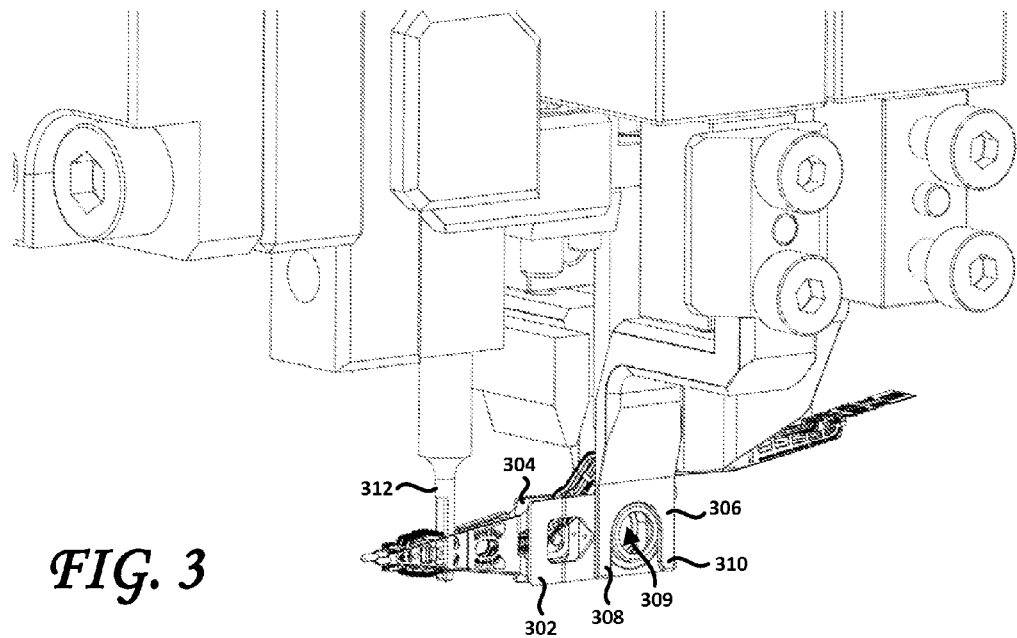
FIG. 3 shows further aspects of a method according to one embodiment and shows a gripper of a device according to one embodiment gripping first and second head gimbal assemblies (HGAs), according to one embodiment.

FIG. 3 shows further aspects of a method according to one embodiment and shows a gripper 306 of a device according to one embodiment gripping first and second HGAs 302, 304, according to one embodiment. As shown, the gripper 306 may be configured to grip and hold the first and the second HGAs 302, 306. In the implementation shown in FIG. 3, the gripper 306 comprises first and second gripper arms 308, 310 that are configured to partially encircle the HGA holes 309 through which a swaging ball may be passed to securely attach the HGAs 302, 304 to their respective APFA arms 104, 106. The distal ends of the HGAs 302, 304, where the slider and lift tabs are located, may be kept apart from one another by gripper pin 312. As the gripper 306 moves towards and grips the first and second HGAs 302, 304, gripper pin 312 is inserted between facing surfaces of the HGAs 302, 304, to prevent damage thereto.

Figure 4:
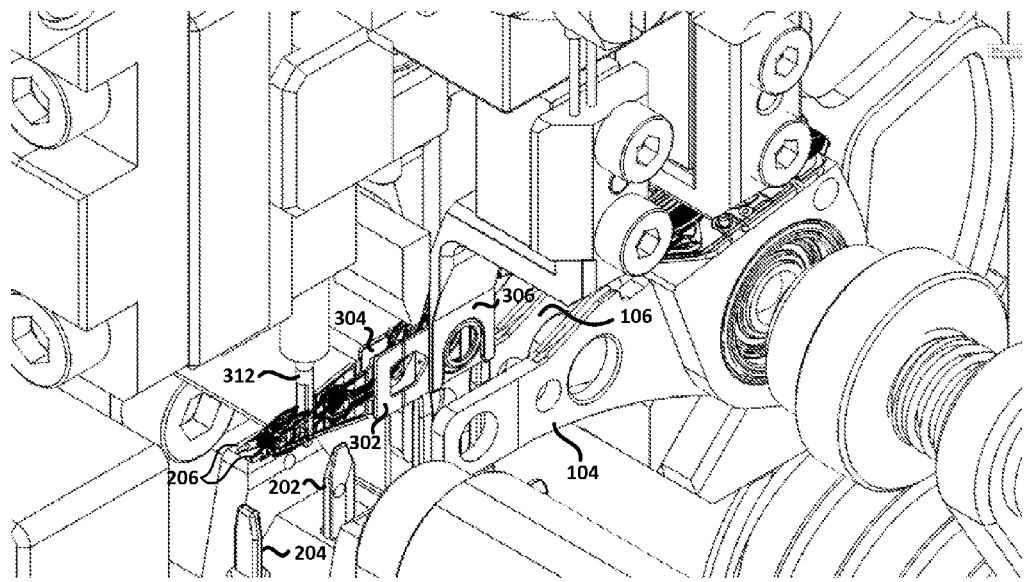
FIG. 4 shows further aspects of a method according to one embodiment and shows the gripper of a device according to one embodiment, as it positions the gripped first and second HGAs between respective actuator arms of an Actuator Pivot Flex Assembly (APFA).
Figure 5:
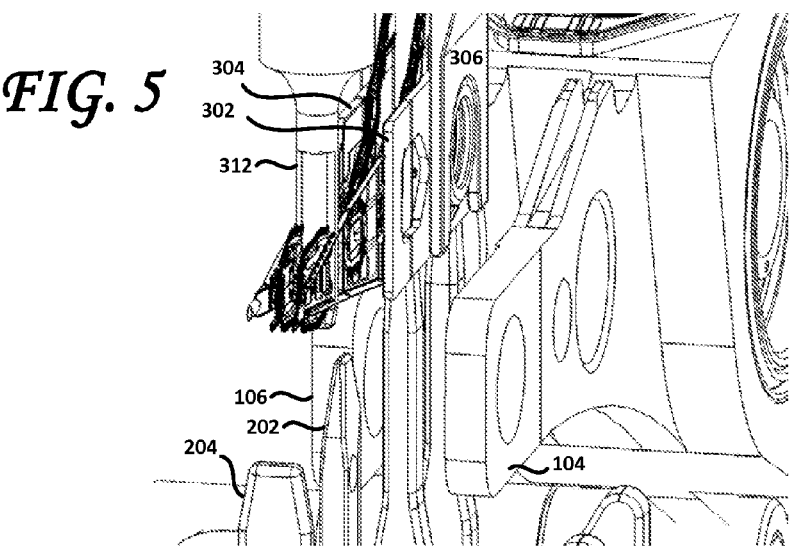
FIG. 5 shows another view of a device according to one embodiment, as the gripper positions the gripped HGAs between facing surfaces of next adjacent APFA arms, according to one embodiment.

The gripper 306 may also be configured to move the gripped first and second HGAs 302, 304 between the facing surfaces of the first and second APFA arms 104, 106 of the held APFA 102, as shown in FIG. 4. FIG. 5 shows another partial view of device 100 according to one embodiment, as the gripper 306 positions the gripped HGAs 302, 304 between facing surfaces of next adjacent APFA arms 104, 106, according to one embodiment.

Figure 6:
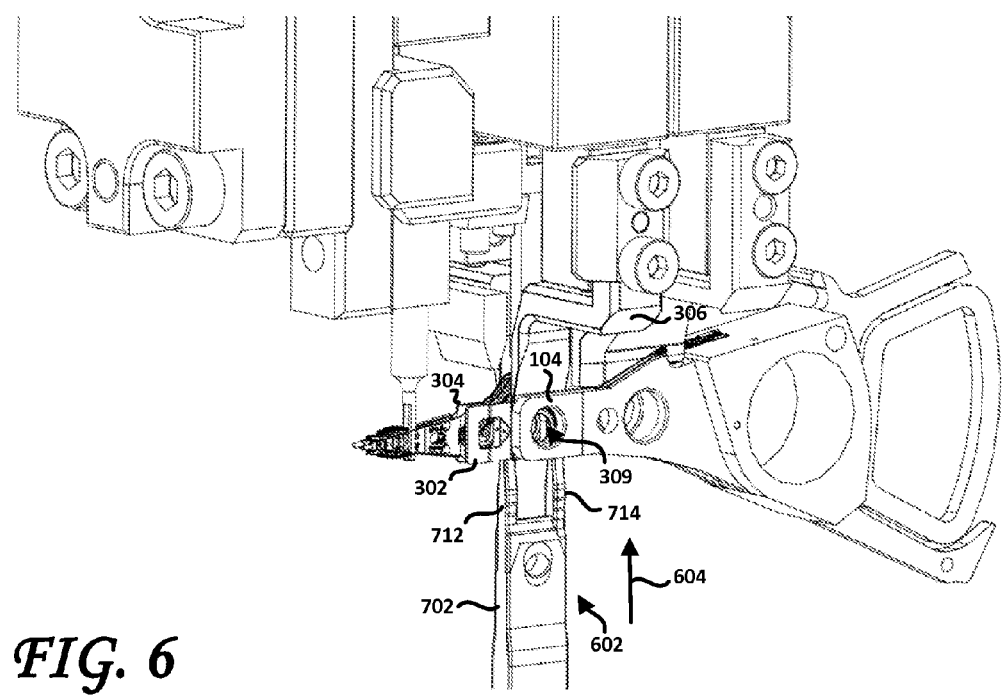
FIG. 6 shows further aspects of a method and device according to one embodiment and shows a swage key according to one embodiment, in a first position.

FIG. 6 shows aspects of a device and a method according to one embodiment. FIG. 6 shows an intermediate stage of the loading of the HGAs 302, 304 onto the APFA arms 104, 106. In this intermediate stage, the HGAs 302, 304 have been moved by the gripper 306 to a position between facing surfaces of next adjacent APFA arms 104, 106 and such that the swage boss holes defined in the respective base plates of the HGAs 302, 304 are aligned with the corresponding boss holes 309 of the first and second APFA arms 104, 106. The boss holes of the HGAs 302, 304 are indeed aligned with the corresponding boss holes 309 of the APFA arms 104, 106, but the HGAs 302, 304 are not disposed against the APFA arms 104, 106, there being, at this intermediate stage, a gap therebetween. That is, there is a gap between the HGA 302 and the first APFA arm 104 and a gap between the HGA 304 and the second APFA arm 106. To properly attach the first and second HGAs 302, 304 to the APFA arms 104, 106, respectively, the HGAs 302, 304 should advantageously be disposed against the APFA arms 104, 106, respectively, such that there is no or substantially no gap therebetween.

Figure 7:
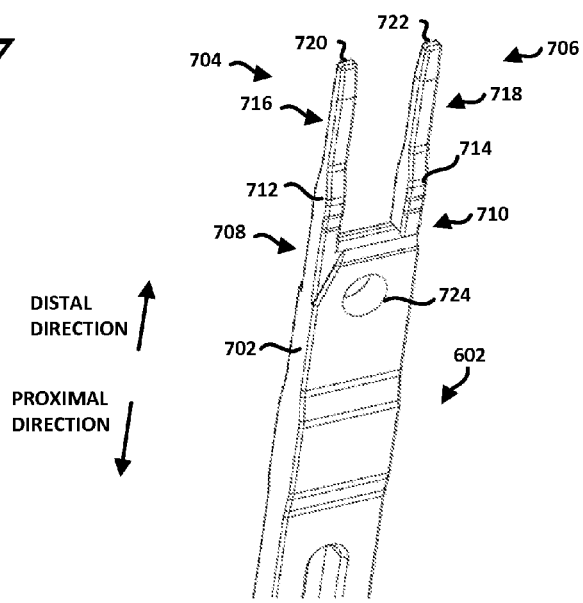
FIG. 7 shows a swage key of a device according to one embodiment.

According to one embodiment, to properly seat the first and second HGAs 302, 304 against the boss holes 309 of the first and second APFA arms 104, 106, thereby closing the aforementioned gaps, the device 100 may also comprise a swage key, as shown in FIG. 6 at reference numeral 602. The swage key 602, also shown in FIG. 7, may comprise a body portion 702. The body portion 702 terminates, at a distal end thereof, in first and second swage key arms 704, 706. The separation of the first and second swage key arms 704, 706 from one another may be at least as great as necessary to clear the boss holes in the respective base plates of the HGAs 302, 304 and the boss holes 309 defined in the first and second APFA arms 104, 106. As best seen in FIG. 7, according to one embodiment, the first and second swage key arms 704, 706 may comprise first and second proximal portions 708, 710, first and second distal portions 716, 718 respectively terminating in first and second free ends 720, 722, and first and second localized humps 712, 714 disposed between the first and second distal portions 716, 718 and the first and second proximal portions 708, 710, respectively.

As also shown in FIG. 7 and according to one embodiment, the proximal portions 708, 710 of the first and second swage key arms 704, 706 may be intermediate in thickness relative to the thickness of the first and second distal portions 716, 718 and the thickness of first and second localized humps 712, 714, respectively. According to one embodiment, the proximal portions 708, 710 of the swage key 602 may be thicker than the distal portions 716, 718 thereof. Moreover, the localized humps 712, 714 may be thicker than at least the distal portions 716, 718. Lastly, the proximal portions 708, 710 of the swage key 602 may be of the same or lesser thickness than the localized humps 712, 714, but thicker than the distal portions 716, 718. It is to be understood that the thickness of at least the localized humps 712, 714 and/or of the proximal portions 708, 710 may be related to the force with which the swage key 602 pushes against the base plates of the first and second HGAs 302, 304 to close the gap with the first and second APFA arms 104, 106. According to one embodiment, the first and second localized humps 712, 714 may define gradual, piece-wise linear slopes between the respective first and second distal portions 716, 718 and between the respective first and second proximal portions 708, 710. Alternatively, the transitions between the distal portions 716, 718 and the localized humps 712, 714 and between the localized humps 712, 714 and the proximal portions 708, 710 may be smoothly curvilinear. The swage key 602 may also define a swage key hole 724 disposed proximally to the distal end of the body portion 702. In any event, the first and second localized humps 712, 714 may be configured at least in height and shape so as to not damage (e.g., scratch) the first and second HGAs 302, 304 as the swage key 602 is moved from the first position to the second and third positions, to properly position the HGAs 302, 304 for the ball swaging process.

According to one embodiment, the swage key 602 may be configured (e.g., controlled) to engage the first and second HGAs 302, 304 and to selectively assume a first position such that the first and second distal portions 716, 718 are disposed between the first and second HGAs 302, 304, respectively. This first position is shown in FIG. 6, in which the first and second swage key arms 704, 706 are engaged between the first and second HGAs 302, 304 which, in turn, are disposed between the first and second APFA arms 104, 106. As the swage key is moved in the direction indicated by 604 (i.e., the distal direction, toward the gripper 306) and caused to assume this first position, the lower aspect of the HGAs 302, 304 will gently abut and become supported by the localized humps 712, 714. In this manner, the first and second HGAs 302, 304 may be supported by the swage key 602, even when the gripper 306 releases the first and second HGAs 302, 304 from its grip.

As the swage key 602 is moved in the distal direction of arrow 604 in FIG. 6, the swage key, according to one embodiment, may be caused to sequentially assume second and third positions, after which the first and second HGAs 302, 304 will have been seated against the boss holes 309 of the first and second APFA arms 104, 106 without incurring damage such as scratches. The seated first and second HGAs 302, 304 are then ready for the swaging process, which attaches the first and second HGAs 302, 304 to the APFA arms 104, 106, respectively.

Figure 8:
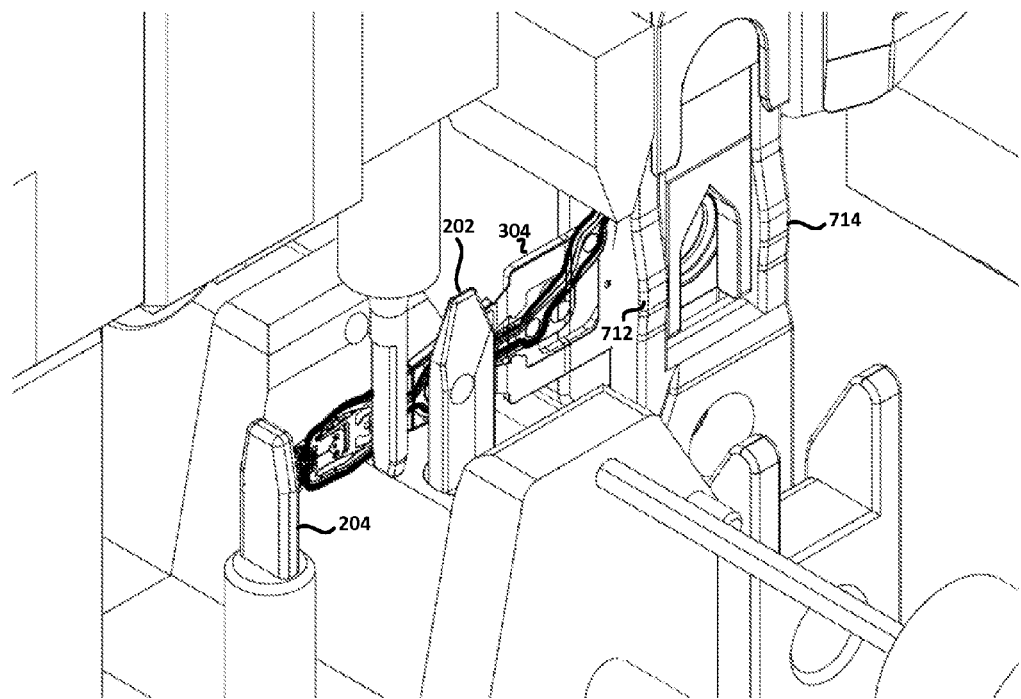
FIG. 8 shows further aspects of a method and device according to one embodiment and shows the swage key in a second position.

As shown in FIG. 8, according to one embodiment, the swage key 602 may then be caused to move (toward the gripper 306, in the distal direction shown at 604 in FIG. 6) from the first position to a second position such that the first and second HGAs 302, 304 are acted upon and pushed by the first and second localized humps 712, 714, respectively. In this position, the HGAs 302, 304 are aligned with and pushed toward the boss holes 309 of the first and second APFA arms 104, 106. The localized humps 712, 714, in effect, push the first and second HGAs 302, 304 in a direction substantially perpendicular to the long axis of the swage key 602 (i.e., substantially perpendicular to the distal-proximal axis), such that the boss holes of the first and second HGAs 302, 304 are pushed against the rims of the boss holes 309 of the first and second APFA arms 104, 106. As the first and second HGAs 302, 304 are pushed against the boss holes (or more precisely, the rims thereof), the gripper 306 may release the gripped first and second HGAs 302, 304, as these are now held in place by the pressure exerted on the HGAs 302, 304 onto the first and second APFA arms 104, 106. It is to be noted that the first HGA 302 has been omitted from FIG. 8, to more clearly show the first and second swage key arms and for clarity of illustration.

Figure 9:
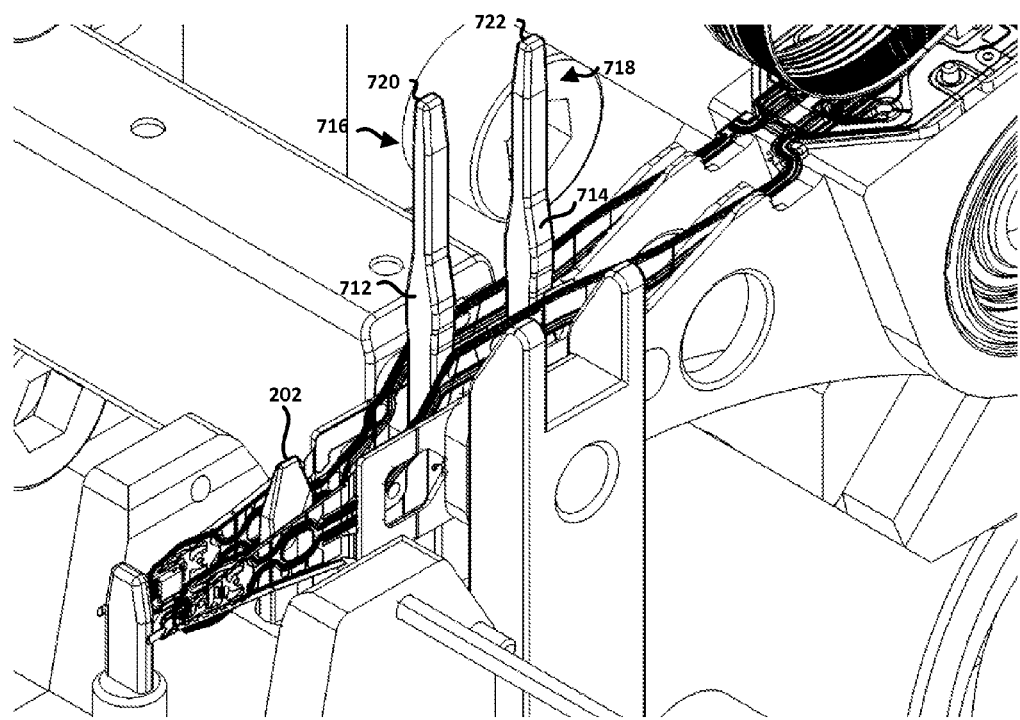
FIG. 9 shows further aspects of a method and device according to one embodiment and shows the swage key in a third position

According to one embodiment, as the swage key is selectively moved from the second position shown in FIG. 8 to the third position thereof shown in FIG. 9, the first and second HGAs 302, 304 at least partially face the first and second proximal portions 708, 710, are pushed toward and become seated onto the first and second boss holes of the HGAs 302, 304, respectively. Part of the first and second HGAs 302, 304 may also face or otherwise come into contact with part of the body portion 702 of the swage key 602. As shown in FIG. 9, in this state, the first and second HGAs 302, 304 are pushed against the facing surfaces of the first and second APFA arms 104, 106 and seated around, onto or partially within the boss holes 309 of the APFA arms 104, 106, in such a manner as to enable a swaging ball to be pushed therethrough, to selectively deform the base plates of the HGAs 302, 304 to cause them to attach to the first and second APFA arms 104, 106. As shown in FIG. 9, the distal portions 716, 718, as well as the localized humps 712, 714 of the swage key arms 704, 706 have been pushed in the distal direction clear of the first and second HGAs 302, 304, leaving the proximal portions 708, 710 (only partially visible in FIG. 9) to face and apply pressure onto the first and second HGAs 302, 304. In this third position, the swage key hole 724 (best seen in FIG. 7) may be aligned with the first and second boss holes 309 of the first and second APFA arms 104, 106, thereby enabling the swaging process to attach the first and second HGAs 302, 304 to the APFA arms 104, 106 to be carried out.

As shown in FIGS. 2, 4, 5 and 8, the device 100 may further comprise a spreader pin 202 disposed so as to space the first and second HGAs 302, 304 a predetermined distance away from one another as and after the gripper 306 moves the gripped first and second HGAs 302, 304 between the first and second APFA actuator arms 104, 106. As best shown in FIG. 4, each of the first and second HGAs 302, 304 may comprise a lift tab 206 at a distal free end thereof. According to one embodiment, the device 100 may further comprise an HGA alignment structure 204 configured to align the lift tabs of the first and second HGAs 302, 304 to a common reference.

Figure 10:
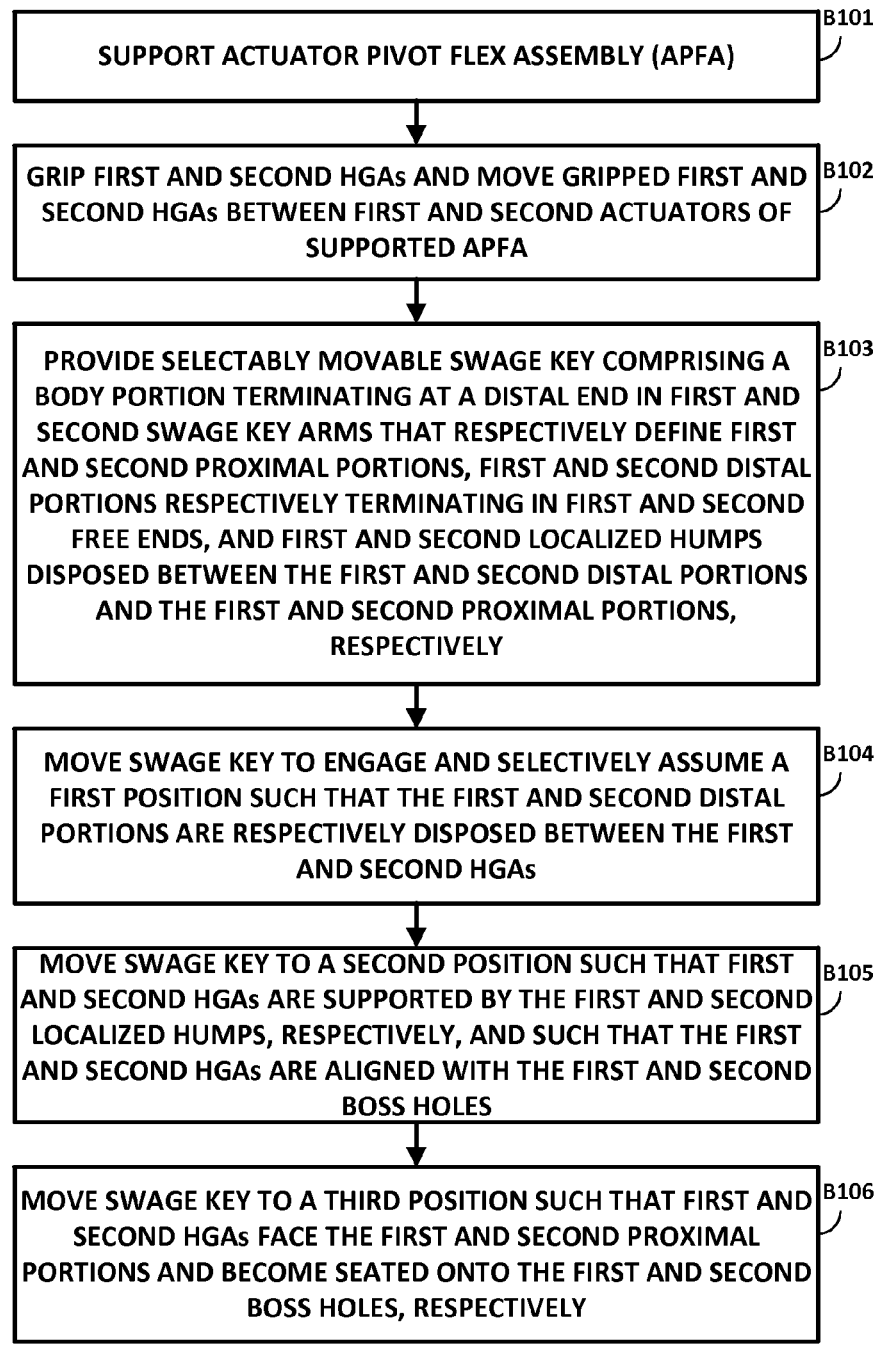
FIG. 10 is a flowchart of a method according to one embodiment.

FIG. 10 is a flowchart of a method of loading a HGA and a second HGA onto an APFA of a data storage device comprising a hard disk drive, according to one embodiment. The APFA may comprise a first APFA arm defining a first boss hole and may comprise a next adjacent second APFA arm defining a second boss hole. According to one embodiment, the method may comprise supporting the APFA, such as shown in block B101 and as shown and described relative to FIG. 1, for example. Block B102 calls for gripping the first and the second HGAs 302, 304 and moving the gripped first and second HGAs 302, 304 between the first and second actuator arms 104, 106 of the supported APFA 102. As shown at B103, the method may then comprise providing a selectively movable swage key as shown in and described relative to FIG. 7, for example. The provided swage key 602 may comprise, for example, a body portion 702 that terminates at a distal end in first and second swage key arms 704, 706. The first and second swage key arms 704, 706 respectively define first and second proximal portions 708, 710 and first and second distal portions 716, 718. The first and second distal portions 716, 718, respectively, terminate in first and second free ends 720, 722. The provided swage key 602 may also comprise, as called for by Block B103, first and second localized humps 712, 714 that may be disposed between the first and second distal portions 716, 718 and the first and second proximal portions 708, 710, respectively. As shown in Block B104, the swage key 602 may then be selectively moved to engage the first and second HGAs 302, 304 and to assume a first position such that the first and second distal portions 716, 718 of the swage key 602 are respectively disposed between the first and second HGAs 302, 304, as shown, for example, in FIG. 4. As shown in Block B105, the swage key 602 may then be moved to a second position such that the first and second HGAs 302, 304 are supported by the first and second localized humps 712, 714, respectively, and in which the first and second HGAs 302, 304 are aligned with the first and second boss holes 319 of the APFA arms 104, 106, as shown in FIG. 6. Block B106 then calls for moving the swage key 602 to a third position such that the first and second HGAs 302, 304 face at least part of the first and second proximal portions 708, 710 and become seated onto the first and second boss holes 309, respectively. In the third position, the first and second HGAs 302, 304 may also face part of the body portion 702 of the swage key 602.

According to further embodiments, the first and second HGAs 302, 304 may be un-gripped by gripper 306 at least before moving the swage key to the third position. Block B103 may be carried out with the proximal portions 708, 710 of the first and second swage key arms 704, 706 being intermediate in thickness relative to the thickness of the first and second distal portions 716, 718 and the thickness of first and second localized humps 712, 714, respectively. These first and second localized humps 712, 714 may define gradual slopes between (e.g., at the transition with) the respective first and second distal portions 716, 718 and between (e.g., at the transition with) the respective first and second proximal portions 708, 710. These first and second humps 712, 714 may be configured to configured to support the first and second HGAs 302, 304, respectively, as they are un-gripped and released by the gripper 306. The transitions from the first distal portion 716 to the first localized hump 712 and from the first localized hump 712 to the first proximal portion 708 may be, according to one embodiment, piecewise linear or smoothly curvilinear and with transitions from the second distal portion 718 to the second localized hump 714 and from the second localized hump 714 to the second proximal portion 710 also being piecewise linear or smoothly curvilinear. According to one embodiment, moving the swage key to the third position as shown in B106 positions the first and second HGAs 302, 304 for a swaging process to attach the first and second HGAs 302, 304 to the first and second APFA arms 104, 106, respectively. In this configuration, the first and second HGAs 302, 304 may be attached to the first and second APFA arms 104, 106, respectively, by a swaging and/or other suitable process. As best shown in FIG. 6, the swage key 602 may define a swage key hole 724 disposed proximally to the distal end of the body portion 702. Moving the swage key 602 to the third position as called for by Block B106 may align the swage key hole 724 with the first and second boss holes 309 of the first and second APFA arms 104, 106. The method may also comprise spacing the first and second HGAs 302, 304 a predetermined distance away from one another as and after the gripper 306 moves the gripped first and second HGAs 302, 304 between the first and second actuator arms 104, 106 of the held APFA. This may be accomplished through the use of, for example, a spreader pin such as shown at reference 202 in the figures. The method may also comprise aligning a lift tab of each of the first and second HGAs 302, 304 to a common reference, such as shown at 204, referencing the lift tab alignment structure.

While certain embodiments of the disclosure have been described, these embodiments have been presented by way of example only, and are not intended to limit the scope of the disclosure. Indeed, the novel methods, devices and systems described herein may be embodied in a variety of other forms. Furthermore, various omissions, substitutions and changes in the form of the methods and systems described herein may be made without departing from the spirit of the disclosure. The accompanying claims and their equivalents are intended to cover such forms or modifications as would fall within the scope and spirit of the disclosure. For example, those skilled in the art will appreciate that in various embodiments, the actual physical structures may differ from those shown in the figures. Depending on the embodiment, certain steps described in the example above may be removed, others may be added. Also, the features and attributes of the specific embodiments disclosed above may be combined in different ways to form additional embodiments, all of which fall within the scope of the present disclosure. Although the present disclosure provides certain preferred embodiments and applications, other embodiments that are apparent to those of ordinary skill in the art, including embodiments which do not provide all of the features and advantages set forth herein, are also within the scope of this disclosure. Accordingly, the scope of the present disclosure is intended to be defined only by reference to the appended claims.

The invention claimed is:

1. A device for loading a first head gimbal assembly (HGA) and a second HGA onto an actuator pivot flex assembly (APFA) of a data storage device comprising a hard disk drive, the APFA comprising a first APFA arm defining a first boss hole and a next adjacent second APFA arm defining a second boss hole, the device comprising:
a support configured to hold the APFA;
a gripper configured to grip the first and the second HGAs and to move the gripped first and second HGAs between the first and second actuator arms of the held APFA; and
a selectively movable swage key comprising a body portion, the body portion terminating at a distal end in first and second swage key arms that respectively define first and second proximal portions, first and second distal portions respectively terminating in first and second free ends, and first and second localized humps disposed between the first and second distal portions and the first and second proximal portions, respectively,
wherein the swage key is configured to selectively assume a first position such that the first and second distal portions are respectively disposed between the first and second HGAs, to move to a second position such that the first and second HGAs are supported by the first and second localized humps, respectively, and such that the first and second HGAs are aligned with the first and second boss holes and to move to a third position such that the first and second HGAs face the first and second proximal portions and become seated onto the first and second boss holes, respectively.

2. The device of claim 1, wherein the gripper is configured to un-grip the first and second HGAs at least before the swage key is moved to the third position.

3. The device of claim 1, wherein the proximal portions of the first and second swage key arms are intermediate in thickness relative to a thickness of the first and second distal portions and a thickness of first and second localized humps, respectively.

4. The device of claim 1, wherein the first and second localized humps define gradual slopes between the respective first and second distal portions and between the respective first and second proximal portions.

5. The device of claim 1, wherein the first and second humps are configured to support the first and second HGAs, respectively, as the first and second HGAs are un-gripped by the gripper.

6. The device of claim 1, wherein transitions from the first distal portion to the first localized hump and from the first localized hump to the first proximal portion are piecewise linear and wherein transitions from the second distal portion to the second localized hump and from the second localized hump to the second proximal portion are piecewise linear.

7. The device of claim 1, wherein in the third position, the swage key is configured to position the first and second HGAs for a swaging process to attach the first and second HGAs to the first and second APFA arms, respectively.

8. The device of claim 1, wherein the swage key defines a swage key hole disposed proximally to the distal end of the body portion and wherein, in the third position, the swage key hole is aligned with the first and second boss holes of the first and second APFA arms.

9. The device of claim 1, wherein the first and second localized humps are configured at least in height and shape so as to not damage the first and second HGAs as the swage key is moved to the second and third positions.

10. The device of claim 1, further comprising a spreader pin disposed so as to space the first and second HGAs a predetermined distance away from one another as the gripper moves the gripped first and second HGAs between the first and second actuator arms of the held APFA.

11. The device of claim 1, wherein each of the first and second HGAs comprises a lift tab at a distal free end thereof and wherein the device further comprises an HGA alignment structure configured to align the lift tabs of the first and second HGAs to a common reference.

12. A method of loading a first head gimbal assembly (HGA) and a second HGA onto an actuator pivot flex assembly (APFA) of a data storage device comprising a hard disk drive, the APFA comprising a first APFA arm defining a first boss hole and a next adjacent second APFA arm defining a second boss hole, the method comprising:
supporting the APFA;
gripping the first and the second HGAs and moving the gripped first and second HGAs between the first and second actuator arms of the supported APFA;
providing a selectively movable swage key comprising a body portion, the body portion terminating at a distal end in first and second swage key arms that respectively define first and second proximal portions, first and second distal portions respectively terminating in first and second free ends, and first and second localized humps disposed between the first and second distal portions and the first and second proximal portions, respectively;

moving the swage key to selectively assume a first position such that the first and second distal portions are respectively disposed between the first and second HGAs;

moving the swage key to a second position such that the first and second HGAs are supported by the first and second localized humps, respectively, and such that the first and second HGAs are aligned with the first and second boss holes; and moving the swage key to a third position such that the first and second HGAs face the first and second proximal portions and become seated onto the first and second boss holes, respectively.

13. The method of claim 12, further comprising un-gripping the first and second HGAs at least before moving the swage key to the third position.

14. The method of claim 12, wherein providing is carried out with the proximal portions of the first and second swage key arms being intermediate in thickness relative to a thickness of the first and second distal portions and a thickness of first and second localized humps, respectively.

15. The method of claim 12, wherein providing is carried out with the first and second localized humps defining gradual slopes between the respective first and second distal portions and between the respective first and second proximal portions.

16. The method of claim 12, wherein providing is carried out with the first and second humps being configured to support the first and second HGAs, respectively, as the first and second HGAs are un-gripped.

17. The method of claim 12, wherein providing is carried out with transitions from the first distal portion to the first localized hump and from the first localized hump to the first proximal portion being piecewise linear and with transitions from the second distal portion to the second localized hump and from the second localized hump to the second proximal portion being piecewise linear.

18. The method of claim 12, wherein moving the swage key to the third position positions the first and second HGAs for a swaging process to attach the first and second HGAs to the first and second APFA arms, respectively.

19. The method of claim 18, further comprising attaching the first and second HGAs to the first and second APFA arms, respectively, by a swaging process.

20. The method of claim 12, wherein the swage key defines a swage key hole disposed proximally to the distal end of the body portion and wherein moving the swage key to the third position aligns the swage key hole with the first and second boss holes of the first and second APFA arms.

21. The method of claim 12, further comprising at least one of:

spacing the first and second HGAs a predetermined distance away from one another as the gripped first and second HGAs are moved between the first and second actuator arms of the held APFA; and aligning a lift tab of each of the first and second HGAs to a common reference.

\* \* \* \* \*